(12) United States Patent
Santra et al.

(10) Patent No.: US 11,435,443 B2
(45) Date of Patent: Sep. 6, 2022

(54) INTEGRATION OF TRACKING WITH CLASSIFIER IN MMWAVE RADAR

(71) Applicant: Infineon Technologies AG, Neubiberg (DE)

(72) Inventors: Avik Santra, Munich (DE); Prachi Vaishnav, Munich (DE)

(73) Assignee: Infineon Technologies AG, Neubiberg (DE)

( * ) Notice: Subject to any disclaimer, the term of this patent is extended or adjusted under 35 U.S.C. 154(b) by 472 days.

(21) Appl. No.: 16/660,194

(22) Filed: Oct. 22, 2019

(65) Prior Publication Data
US 2021/0116540 A1 Apr. 22, 2021

(51) Int. Cl.
*G01S 7/41* (2006.01)
*G01S 13/70* (2006.01)
(Continued)

(52) U.S. Cl.
CPC ............ *G01S 7/415* (2013.01); *G01S 13/723* (2013.01); *G06K 9/6232* (2013.01); *G06K 9/6257* (2013.01); *G06K 9/6265* (2013.01); *G06K 9/6268* (2013.01); *G06V 10/147* (2022.01); *G06V 10/30* (2022.01); *G06V 10/75* (2022.01); *G06V 40/23* (2022.01); *G06V 2201/07* (2022.01)

(58) Field of Classification Search
CPC ................................. G01S 7/415; G01S 13/70
USPC .......................................................... 342/99
See application file for complete search history.

(56) References Cited

U.S. PATENT DOCUMENTS

| 4,241,347 A | 12/1980 | Albanese et al. |
| 6,147,572 A | 11/2000 | Kaminski et al. |

(Continued)

FOREIGN PATENT DOCUMENTS

| CN | 1463161 A | 12/2003 |
| CN | 1716695 A | 1/2006 |

(Continued)

OTHER PUBLICATIONS

Gurbuz, Sevgi Zubeyde et al., "Radar-Based Human-Motion Recognition with Deep Learning—Promising applications for indoor monitoring", IEEE Signal Processing Magazine, Advances in Radar Systems for Modern Civilian and Commercial Applications: Part 1, Jul. 2019, 13 pages.

(Continued)

*Primary Examiner* — Jeffery A Williams
(74) *Attorney, Agent, or Firm* — Slater Matsil, LLP

(57) ABSTRACT

In an embodiment, a method for tracking a target using a millimeter-wave radar includes: receiving radar signals using the millimeter-wave radar; generating a range-Doppler map based on the received radar signals; detecting a target based on the range-Doppler map; tracking the target using a track; generating a predicted activity label based on the track, where the predicted activity label is indicative of an actual activity of the target; generating a Doppler spectrogram based on the track; generating a temporary activity label based on the Doppler spectrogram; assigning an uncertainty value to the temporary activity label, where the uncertainty value is indicative of a confidence level that the temporary activity label is an actual activity of the target; and generating a final activity label based on the uncertainty value.

20 Claims, 11 Drawing Sheets

(51) Int. Cl.
*G01S 13/72* (2006.01)
*G06K 9/62* (2022.01)
*G06V 10/30* (2022.01)
*G06V 10/75* (2022.01)
*G06V 10/147* (2022.01)
*G06V 40/20* (2022.01)

(56) References Cited

U.S. PATENT DOCUMENTS

| | | |
|---|---|---|
| 6,414,631 B1 | 7/2002 | Fujimoto |
| 6,636,174 B2 | 10/2003 | Arikan et al. |
| 7,048,973 B2 | 5/2006 | Sakamoto et al. |
| 7,057,564 B2 | 6/2006 | Tsai et al. |
| 7,171,052 B2 | 1/2007 | Park |
| 7,317,417 B2 | 1/2008 | Arikan et al. |
| 7,596,241 B2 | 9/2009 | Rittscher et al. |
| 7,692,574 B2 | 4/2010 | Nakagawa |
| 7,873,326 B2 | 1/2011 | Sadr |
| 7,889,147 B2 | 2/2011 | Tam et al. |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,413,079 B2 | 8/2016 | Kamgaing et al. |
| 9,495,600 B2 | 11/2016 | Heu et al. |
| 9,886,095 B2 | 2/2018 | Pothier |
| 9,935,065 B1 | 4/2018 | Baheti et al. |
| 10,795,012 B2 | 10/2020 | Santra et al. |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0182433 A1* | 7/2010 | Shimbo ............... G06V 10/143 348/E7.085 |
| 2010/0207805 A1 | 8/2010 | Haworth |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2014/0028542 A1 | 1/2014 | Lovitt et al. |
| 2014/0070994 A1 | 3/2014 | Schmalenberg et al. |
| 2014/0145883 A1 | 5/2014 | Baks et al. |
| 2014/0266860 A1 | 9/2014 | Blumrosen et al. |
| 2014/0324888 A1 | 10/2014 | Xie et al. |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0135655 A1 | 5/2016 | Ahn et al. |
| 2016/0146931 A1 | 5/2016 | Rao et al. |
| 2016/0146933 A1 | 5/2016 | Rao et al. |
| 2016/0178730 A1 | 6/2016 | Trotta et al. |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar Y.B. et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0364160 A1 | 12/2017 | Malysa et al. |
| 2018/0046255 A1 | 2/2018 | Rothera et al. |
| 2018/0071473 A1 | 3/2018 | Trotta et al. |
| 2018/0101239 A1 | 4/2018 | Yin et al. |
| 2021/0103027 A1* | 4/2021 | Harrison ............... G01S 7/417 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| EP | 2589979 A1 | 5/2013 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |

(56) References Cited

FOREIGN PATENT DOCUMENTS

| JP | 2013521508 A | 6/2013 |
|---|---|---|
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Zhang, Renyuan et al., "Real-Time Human Motion Behavior Detection via CNN Using mmWave Radar", Sensors Council, vol. 3, No. 2, Feb. 2019, 4 pages.

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://iap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWRIxxx Power Management Optimizations—Low Cost LC Filter Solution," Application Report SWRA577, Texas Instruments, Oct. 2017, 19 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Angelov, Aleksandar et al., "Practical classification of different moving targets using automotive radar and deep neural networks," IET Radar, Sonar & Navigation, vol. 12, Issue 10, Sep. 20, 2018, IET, 8 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Nguyen, Viet Duc et al., "Reducing Computational Complexity of Gating Procedures Using Sorting Algorithms," Proceedings of the 16th International Conference on Information Fusion, Jul. 9-12, 2013, IEEE, 7 pages.

Richards, Mark A., "Fundamentals of Radar Signal Processing," McGraw Hill Electronic Engineering, ISBN: 0-07-144474-2, Jun. 2005, 93 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.

* cited by examiner

Classifier Confusion Matrix

| Predicted Class | walk | sit | stand | wave | Correct % / Incorrect % |
|---|---|---|---|---|---|
| walk | 22 / 25.3% | 2 / 2.3% | 0 / 0.0% | 0 / 0.0% | 91.7% / 8.3% |
| sit | 4 / 4.6% | 15 / 17.2% | 2 / 2.3% | 0 / 0.0% | 71.4% / 28.6% |
| stand | 0 / 0.0% | 3 / 3.4% | 19 / 21.8% | 0 / 0.0% | 86.4% / 13.6% |
| wave | 0 / 0.0% | 0 / 0.0% | 0 / 0.0% | 20 / 23.0% | 100% / 0.0% |
|  | 84.6% / 15.4% | 75.0% / 25.0% | 90.5% / 9.5% | 100% / 0.0% | 87.4% / 12.6% |

True Class: walk, sit, stand, wave

Actual correct prediction % / Actual incorrect prediction %

FIG. 10C

Tracker Confusion Matrix

| Predicted Class | walk | sit | stand | wave | Correct % / Incorrect % |
|---|---|---|---|---|---|
| walk | 21 / 24.7% | 1 / 1.2% | 0 / 0.0% | 0 / 0.0% | 95.5% / 4.5% |
| sit | 0 / 0.0% | 19 / 22.4% | 1 / 1.2% | 0 / 0.0% | 95.0% / 5.0% |
| stand | 3 / 3.5% | 0 / 0.0% | 20 / 23.5% | 0 / 0.0% | 87.0% / 13.0% |
| wave | 0 / 0.0% | 0 / 0.0% | 0 / 0.0% | 20 / 23.5% | 100% / 0.0% |
|  | 87.7% / 12.5% | 95.0% / 5.0% | 95.2% / 4.8% | 100% / 0.0% | 94.1% / 5.9% |

True Class: walk, sit, stand, wave

Actual correct prediction % / Actual incorrect prediction %

FIG. 10D ents in all three in the past few years due to
INTEGRATION OF TRACKING WITH CLASSIFIER IN MMWAVE RADAR

TECHNICAL FIELD

The present disclosure relates generally to an electronic system and method, and, in particular embodiments, to an integration of tracking with classifier in a millimeter-wave (mmWave) radar.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 24 GHz, 60 GHz, 77 GHz, and 80 GHz and also beyond 100 GHz. Such applications include, for example, static and moving object detection and tracking.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, a receive antenna to receive the RF, as well as the associated RF circuitry used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

In some settings, static objects coexist with moving objects. For example, in an indoor setting, static objects, such as furniture and walls, coexist with moving objects such as humans. An indoor setting may also include object exhibiting periodic movements, such as fans. Doppler analysis has been used to distinguish between moving and static objects.

SUMMARY

In accordance with an embodiment, a method for tracking a target using a millimeter-wave radar includes: receiving radar signals using the millimeter-wave radar; generating a range-Doppler map based on the received radar signals; detecting a target based on the range-Doppler map; tracking the target using a track; generating a predicted activity label based on the track, where the predicted activity label is indicative of an actual activity of the target; generating a Doppler spectrogram based on the track; generating a temporary activity label based on the Doppler spectrogram; assigning an uncertainty value to the temporary activity label, where the uncertainty value is indicative of a confidence level that the temporary activity label is an actual activity of the target; and generating a final activity label based on the uncertainty value.

In accordance with an embodiment, a millimeter-wave radar system includes: a millimeter-wave radar configured to transmit and receive radar signals; and a processor including: a radar processing block configured to generate a range-Doppler map based on the radar signals received by the millimeter-wave radar; a target detector block configured to detect a target based on the range-Doppler map; a tracker configured to: track the target using a track, and generate a predicted activity label based on the track, where the predicted activity label is indicative of an actual activity of the target; a feature extraction block configured to generate a Doppler spectrogram based on the track; a classifier configured to generate a temporary activity label based on the Doppler spectrogram; and a classification gating block configured to receive an uncertainty value associated to the temporary activity label and produce gating data based on the uncertainty value, the predicted activity label, and the temporary activity classification, where the uncertainty value is indicative of a confidence level that the temporary activity label is an actual activity of the target, and where the tracker is configured to generate a final activity label based on the gating data.

In accordance with an embodiment, a method for tracking a target using a millimeter-wave radar includes: receiving radar signals using the millimeter-wave radar; generating a range-Doppler map based on the received radar signals; detecting a target based on the range-Doppler map; using a tracker to track the target using a track; using a classifier to generate a temporary activity label based on an output of the tracker; and using the tracker to generate a final activity label based on an output of the classifier, where the tracker tracks activity labels of the target using state variables.

BRIEF DESCRIPTION OF THE DRAWINGS

For a more complete understanding of the present invention, and the advantages thereof, reference is now made to the following descriptions taken in conjunction with the accompanying drawings, in which:

FIGS. 10C and 10D show confusion matrices for classifier 812 and tracker 808, respectively, according to an embodiment of the present invention.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a millimeter-wave radar that integrates a tracker that tracks human targets with a classifier that classifies human activities. Embodiments of the present invention may be used in other types of radars. Some embodiments may be used to track targets other than humans, such as an animal (e.g., a dog or cat) or a robot. Some embodiments may be used to classify targets using a criteria different from human activities, such as classifying the type of target (e.g., whether it is human or non-human).

In an embodiment of the present invention, a millimeter-wave radar includes a tracker that has an integrated classifier for classifying human target activities. The tracker implements the integrated classifier by using state variables corresponding to possible human activities. The tracker updates the state variables associated with human activities based on an output of a classifier that generates a temporary classification based on an output of the tracker. In some embodiments, thus, the tracker is advantageously capable of tracking, in addition to the localization of the human target, the corresponding human activities.

Figure 1:
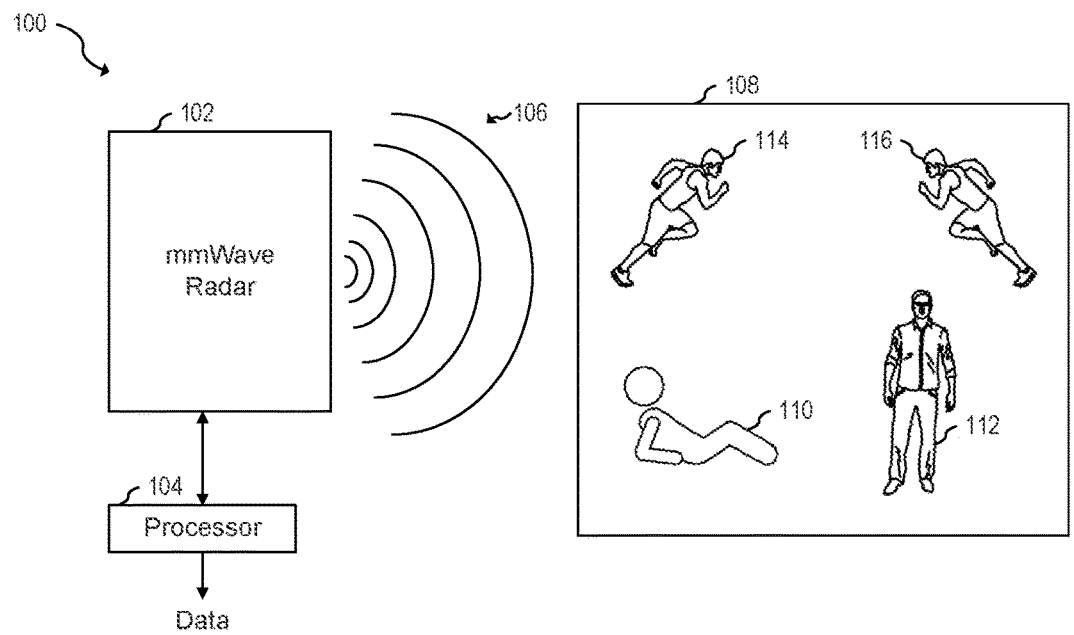
FIG. 1 shows a radar system, according to an embodiment of the present invention.

A radar, such as a millimeter-wave radar, may be used to detect and track targets, such as humans. For example, FIG. 1 shows radar system 100, according to an embodiment of the present invention. Radar system 100 includes millimeter-wave radar 102 and processor 104. In some embodiments, millimeter-wave radar 102 includes processor 104.

During normal operation, millimeter-wave radar 102 transmits a plurality of radiation pulses 106, such as chirps, towards scene 108. In some embodiments the chirps are linear chirps (i.e., the instantaneous frequency of the chirp varies linearly with time).

The transmitted radiation pulses 106 are reflected by objects in scene 108. The reflected radiation pulses (not shown in FIG. 1), which are also referred to as the echo signal, are detected by millimeter-wave radar 102 and processed by processor 104 to, for example, detect and track targets, such as humans.

The objects in scene 108 may include static humans, such as lying human 110, humans exhibiting low and infrequent motions, such as standing human 112, and moving humans, such as running or walking human 114 and 116. The objects in scene 108 may also include static objects, such as furniture and periodic movement equipment (not shown). Other objects may also be present in scene 108.

Processor 104 analyses the echo data to determine the location of humans using signal processing techniques. For example, in some embodiments, a range FFT is used for estimating the range component of the location of a detected human (e.g., with respect to the location of the millimeter-wave radar). The azimuth component of the location of the detected human may be determined using angle estimation techniques.

In some embodiments, a range-Doppler map (image) is generated from the echo data, and a two-dimensional (2D) moving target identification (MTI) is performed on the range-Doppler map to detect moving targets.

Processor 104 may be implemented as a general purpose processor, controller or digital signal processor (DSP) that includes, for example, combinatorial circuits coupled to a memory. In some embodiments, the processor 104 may be implemented with an ARM architecture, for example. In some embodiments, processor 104 may be implemented as a custom application specific integrated circuit (ASIC). In some embodiments, processor 104 includes a plurality of processors, each having one or more processing cores. In other embodiments, processor 104 includes a single processor having one or more processing cores. Other implementations are also possible. Some embodiments may be implemented as a combination of hardware accelerator and software running on a DSP or general purpose microcontroller.

In some embodiments, millimeter-wave radar 102 operates as a FMCW radar that includes, a millimeter-wave radar sensor circuit, a transmitting antenna, and at least two receiving antennas. Millimeter-wave radar 102 transmits and receives signals in the 20 GHz to 122 GHz range. Alternatively, frequencies outside of this range, such as frequencies between 1 GHz and 20 GHz, or frequencies between 122 GHz, and 300 GHz, may also be used.

In some embodiments, the echo signals received by the receiving antennas of millimeter-wave radar 102 are filtered and amplified using band-pass filter (BPFs), low-pass filter (LPFs), mixers, low-noise amplifier (LNAs), and intermediate frequency (IF) amplifiers in ways known in the art. The echo signals are then digitized using one or more analog-to-digital converters (ADCs) for further processing. Other implementations are also possible.

Detecting and tracking human target(s), e.g., in an indoor environment, may be desirable for a variety of reasons. Conventional methods for tracking a target assume that that the target is a single point in the range-Doppler map. In a conventional range-Doppler processing chain, the cluster of detections obtained is used to obtain a single bin in a range-Doppler image to determine range and Doppler components of the target detected. Such single bin is then fed into the tracker for tracking the target. For example, in conventional radar signal processing, the range, Doppler and angle of arrival may be detected for the single point target. Such components are then fed into the tracker for tracking purposes.

The motion model for a conventional tracker may be expressed as $$\begin{cases} px(k+1) = px(k) + \Delta t \cdot vx(k) \\ py(k+1) = py(k) + \Delta t \cdot vy(k) \\ vx(k+1) = vx(k) \\ vy(k+1) = vy(k) \end{cases} \quad (1)$$

where k represents a discrete time step, $\Delta t$ is the time between each time step, px is the position of the target in the x direction, py is the position of the target in the y direction, vx is the velocity of the target in the x direction, and vy is the velocity of the target in the y direction.

Figure 2:
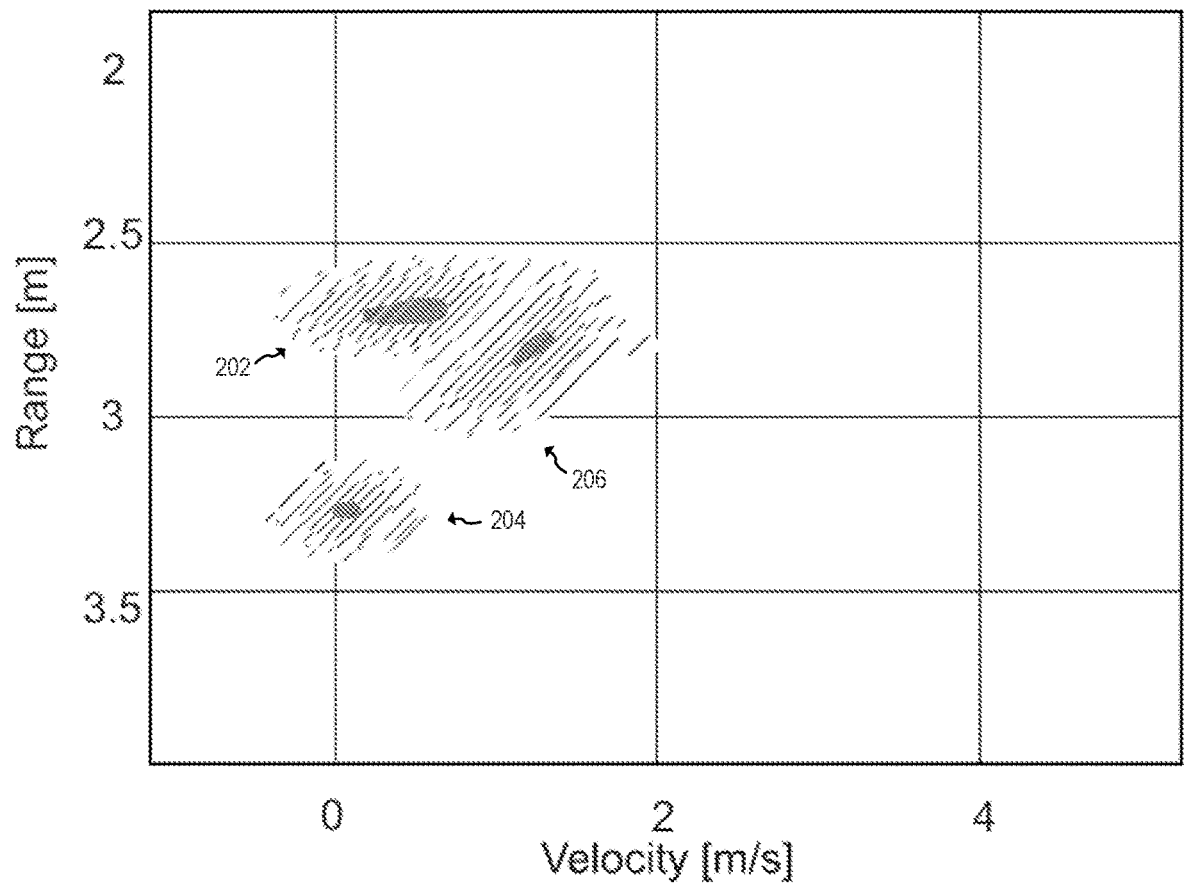
FIG. 2 shows a range-Doppler map of a moving human captured with a millimeter-wave radar system, according to an embodiment of the present invention.

In some radar systems, such as in a millimeter-wave radar system, a human target may exhibit a double spread across range and Doppler bins as reflections are received from different parts of the human body during movement of the human target. For example, FIG. 2 shows a range-Doppler map of a moving human captured with a millimeter-wave radar system, according to an embodiment of the present invention. As shown in FIG. 2, a human target may exhibit peaks at different locations of the range-Doppler map corresponding to different portions of the human target body, such as the right foot 204, left foot 202, and torso and hands 206.

In some embodiments, a tracker may use a coordinated turn motion model, such as described in co-pending U.S. patent application Ser. No. 16/570,190, filed on Sep. 13, 2019, and entitled "Human Target Tracking System and Method," which is incorporated herein by reference. For example, in some embodiments, the coordinated turn motion model used by the tracker may be given by $$\begin{cases} px(k+1) = px(k) + \Delta t \cdot v_c(k) \cdot \cos(\theta(k)) \\ py(k+1) = py(k) + \Delta t \cdot v_c(k) \cdot \sin(\theta(k)) \\ lx(k+1) = lx(k) + vlx(k) \cdot \Delta t \\ ly(k+1) = ly(k) + vly(k) \cdot \Delta t \\ vlx(k+1) = vlx(k) \\ vly(k+1) = vly(k) \\ v_c(k+1) = v_c(k) \\ \theta(k+1) = \theta(k) + \Delta t \cdot \omega(k) \\ \omega(k+1) = \omega(k) \end{cases} \quad (2)$$

where k represents a discrete time step, $\Delta t$ is the time between each time step, px is the position of the centroid of the human target in the x direction, py is the position of the centroid of the human target in the y direction, lx is the bounding box dimension in the x direction, ly is the bounding box dimension in the y direction, vlx is the rate of change in the x dimension of the bounding box, vly is the rate of change in the y dimension of the bounding box, $v_c$ is the radial velocity of the centroid of the human target, $\theta$ is the angle of arrival of the human target, and $\omega$ is the rate of change of the angle of arrival (AoA) of the human target, where the bounding box may have a rectangular shape and surround the spread in Doppler and range of a target.

In an embodiment, parameters px, py, lx, ly, vlx, vly, $v_c$, $\theta$, and/or $\omega$ represent states of a tracker (e.g., implemented with a Kalman filter, such as the unscented Kalman filter) that tracks a human target with a track. These states may be obtained from measurements of millimeter-wave radar system 100. For example, in an embodiments, millimeter-wave radar system 100 measures r (range of the target from the millimeter-wave radar sensor), $\theta$ (angle of arrival–angle of the target), $v_c$ (radial velocity of the target), $L_r$ (bounding box dimension across range), and $L_d$ (bounding box dimension across Doppler). These measurements may collectively be referred to as $$Zmeas = (r, \theta, v_c, L_r, L_d) \quad (3)$$

The Zmeas measurements may be converted into states of the tracker by $$\begin{cases} px = r \cdot \cos(\theta) \\ py = r \cdot \sin(\theta) \\ lx = L_r \\ ly = L_d \\ \theta = \theta \\ v_c = v_c \end{cases} \quad (4)$$

where $\omega$, vlx, and vly are initialized as zero.

At each time step, a new set of measurements Zmeas is collected, and the track is updated based on such new set of measurements Zmeas. For example, the, e.g., unscented Kalman filter computes (for the track) predicted states px, py, lx, ly, vlx, vly, $v_c$, $\theta$, and $\omega$, for every time step (e.g., using Equation 2). Due to Bayes recursive approach, these states may embody information from all measurements available from time 1:k–all measurements of the track). Such predicted states may be converted into the form of a predicted measurement by $$Zpred = (r = \sqrt{px^2 + py^2}, \theta, v_c, lx, ly) \quad (5)$$

The Mahalanobis distance may be computed between the predicted measurements Zpred and a new set of measurements Zmeas by $$Md = \sqrt{(Zpred - Zmeas)S^{-1}(Zpred - Zmeas)^T} \quad (6)$$

where S is the covariance matrix between Zmeas and Zpred.

In some embodiments, the new set of measurement Zmeas is considered a valid measurement of the target being tracked by the track if the distance Md is lower than a predetermined threshold. The multi-dimensional region in which the distance Md is lower than the predetermined threshold is referred to as the gating region or expected region associated to the track.

In many applications, it may be desirable to classify a target. For example, in some embodiments, it may be advantageous to classify a target as a human or non-human. For example, the lights of a room may be automatically be turned on when target is determined to be a human target (e.g., as opposed to a non-human target, such as a dog, for example).

Other classifications may also be advantageous. For example, in some embodiments, human targets are classified based on the activities being performed (e.g., walking, running, standing, sitting, lying down, etc.). For example, if a target is determined to be a human target, some embodiments may further assign an activity classification to such human target. Such activity classification may be used to enhance the localization tracking of the human target. For example, a human target may have a higher probability of remaining in the same place when the human target is performing the activity of sitting, than when the human target is performing the activity of running. Such activity classification may also be used for other purposes. For example, a system may take an action based on what type of activity the detected human is performing. For example, a system may turn on a warning light when a human target is detected performing the activity of lying in the floor, or from transitioning from walking to lying in the floor. In other words, the obtained (e.g., activity) label may be used to further track the target, e.g., by updating state variables of the tracker based on the (e.g., activity) label.

Figure 3:
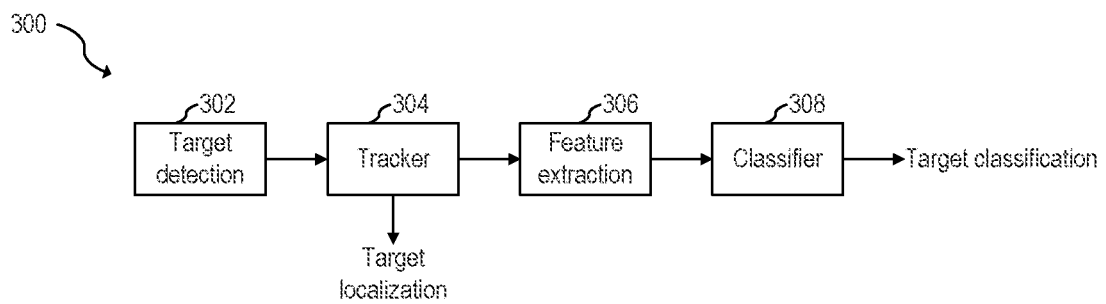
FIG. 3 shows a block diagram illustrating a classifier generating a target classification based on an output of a tracker.

To classify a target, a classifier may be used in open loop. For example, FIG. 3 shows block diagram 300 illustrating classifier 308 generating a target classification based on an output of tracker 304. As shown in FIG. 3, after a radar (e.g., millimeter-wave radar 102 together with processor 104) performs target detection 302, a tracker 304 tracks such target. Tracker localization (e.g., identifying the location of the target) is generated by the tracker 304. A feature extraction 306 is performed based on the output of tracker 304. The extracted feature (e.g., a Doppler spectrogram) is fed to a classifier 308 for classification purposes. The classifier then classifies the target based on the feature received. In some embodiments, detection parameters (parameters associated with 302, 304, and 306) are updated each frame while the target classification is updated every N frames, where N may be, e.g., 8.

Possible classifications include, for example, whether a target is human or non-human. Other classifications include, for example, activity classifications. For example, when a target is identified as a human target, possible activity classifications may include: running, walking, sleeping, sitting, waving, falling, cooking, working, etc.

Figure 4:
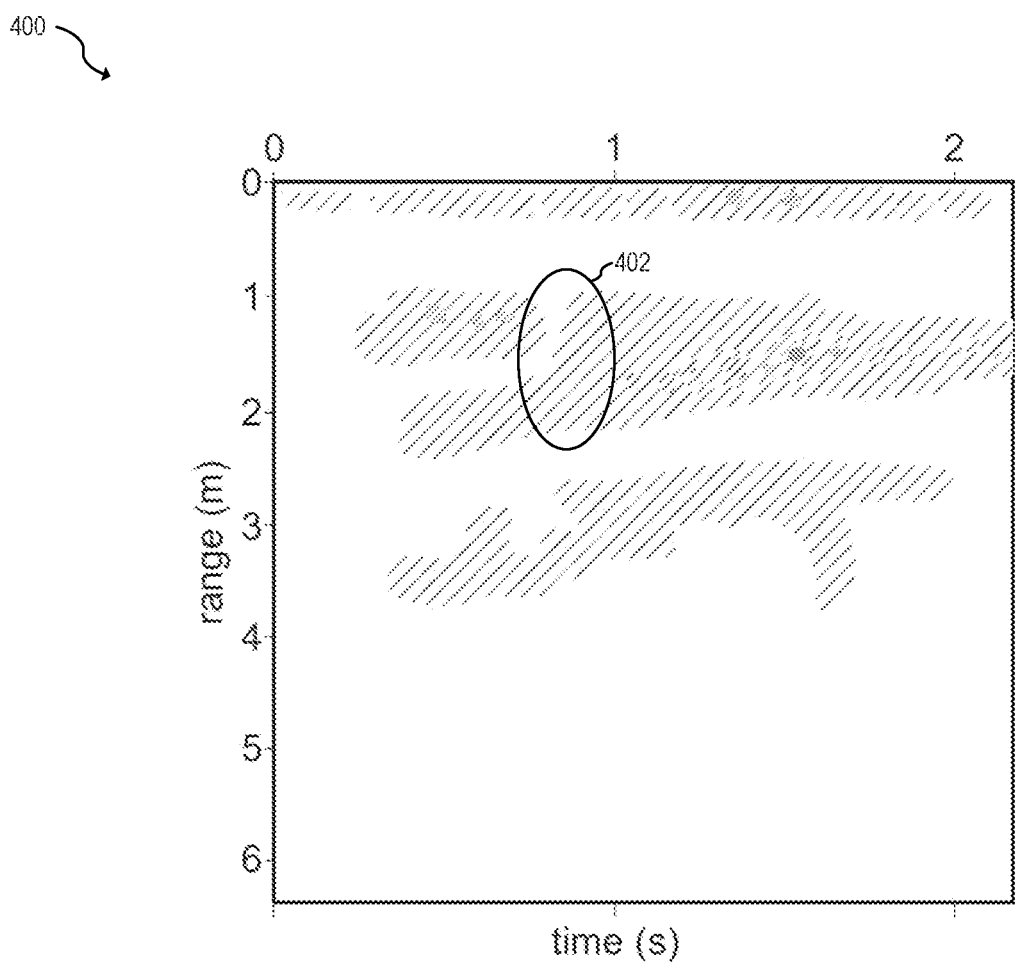
FIGS. 4-6 illustrate scenarios that, when fed into a classifier, may result in misclassification of the target.
Figure 5:
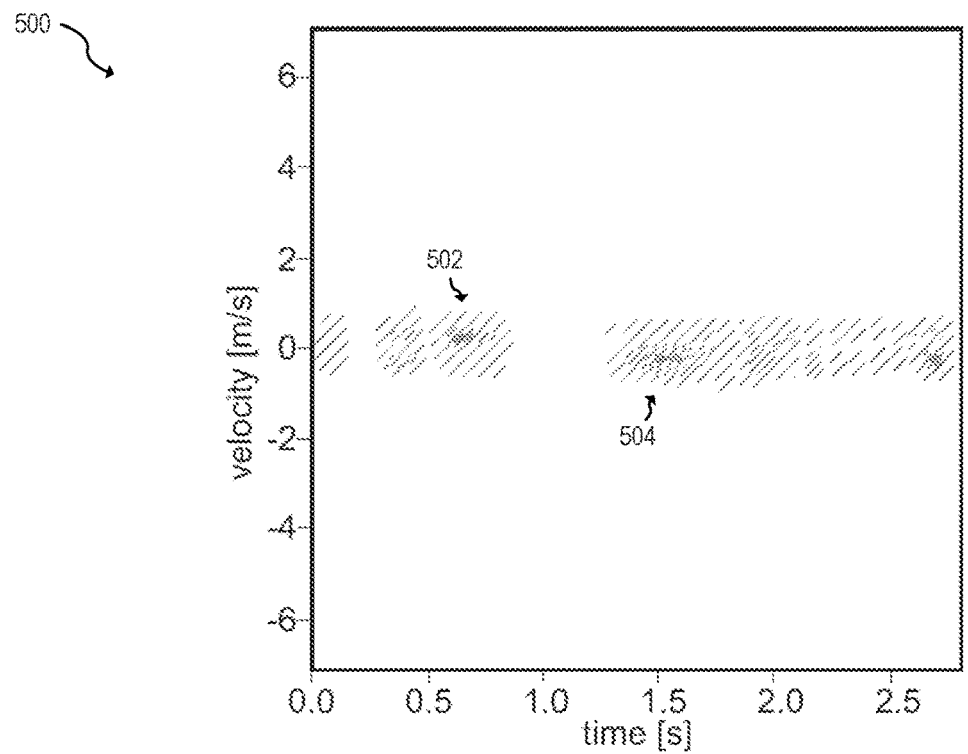
Figure 6:
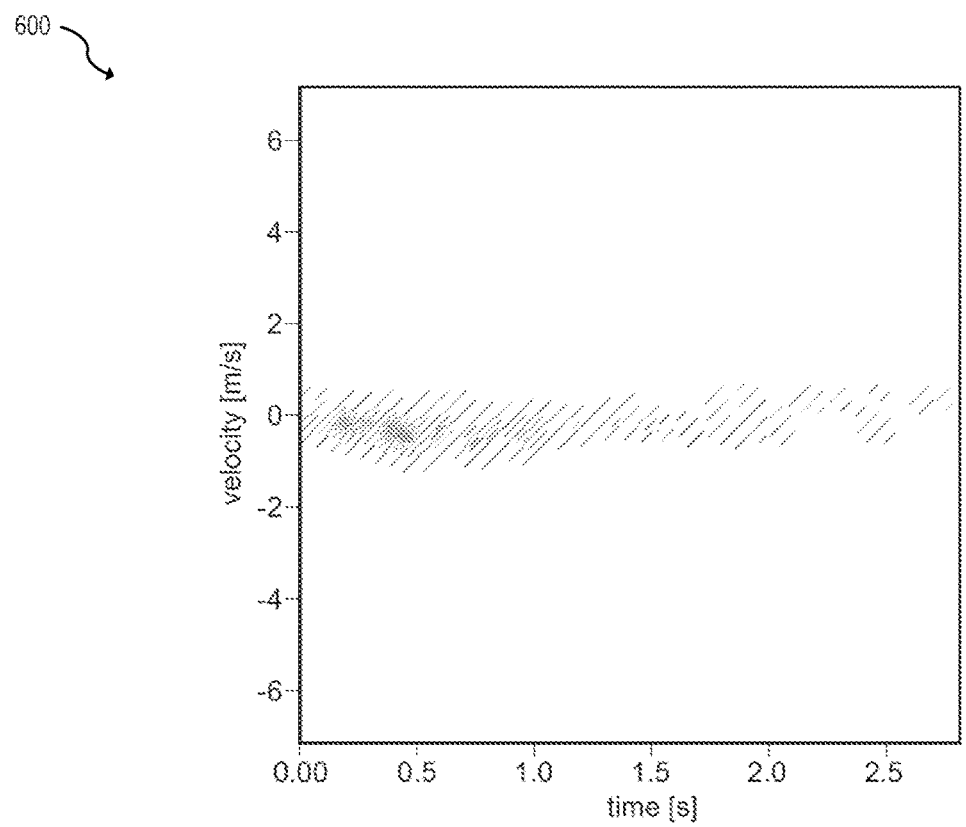

During normal operation, misclassifications of a target may occur for a variety of reasons. For example, a radar, such as millimeter-wave radar 102, may produce outputs that, when processed, may result in misclassifications. FIGS. 4-6 illustrate scenarios that, when fed into a classifier, may result in misclassification of the target.

FIG. 4 shows graph 400 of a human target that is not detected during a portion of time, as shown by region 402. During a misdetection, a track of the tracker 304 may not get associated with a detection, and, therefore, there may not be a feature extraction during that frame, which is a source of error that may result in misclassification.

FIG. 5 shows graph 500 of two human targets (502 and 504) located in the same range bins in a radar system having two receiving antennas. Generally, a radar system having only two receiving antennas is capable of localizing, at most, one target. When two targets are present in such system, an under-determined system of equations may result in the inability to extract features independently for each target, which is a source of error that may result in misclassification.

FIG. 6 shows graph 600 of a human target that is transitioning between activities (e.g., from walking to standing to sitting). When a human target performs an activity that was not previously used for training the classifier 308 (e.g., the activity was not part of the library used to train the classifier), the classifier 308 may assign a wrong classification to the target. Transients that may occur between transitions from a first activity (e.g., walking) to a second activity (e.g., standing) may also be a source of error that may result in misclassification.

In an embodiment, the state variables of a tracker include state variables associated with human activities. The tracker, thus, predicts, during a prediction step, the next human activity of the human target based on the history of the track. A classifier generates a temporary target classification based on features extracted from an output of the tracker. During the prediction step, the tracker assigns an uncertainty value to the temporary target classification (e.g., using Bayes recursion). The tracker then updates the human activity state variables with the predicted value when the classification uncertainty value is above a threshold, or with the temporary target classification when the uncertainty value is below the threshold. Then tracker then generates a target classification based on the updated human activity state variables.

By generating the target classification using the tracker, some embodiments advantageously improve the classification accuracy when compared to applications that use a classifier in open loop configuration (without using the tracker to track human activities and/or without feeding the output of the classifier back to the tracker). For example, when the classifier produces a temporary human activity classification with a high uncertainty value (e.g., because the human activity is a new activity that was not used during the training of the classifier) the tracker uses the predicted activity instead.

Other advantages include that, in some embodiments, the localization tracking is enhanced by using the activity classification state. For example, when a first human target is sitting and a second human target walks near the location of the first human target, the data association when the human targets path cross may be enhance by the knowledge that the first human target is sitting (and, e.g., the probability of the first human target to remain sitting is high), and the second human target is walking (and, e.g., the probability of the second human target to remain walking is high). Thus, in this example, e.g., target detections near the first and second human targets corresponding to a target that is not moving are assigned to the track of the first human target while target detections near the first and second human targets corresponding to a moving target are assigned to the track of the second human target.

In an embodiment, the tracker includes, in addition to other state variables (e.g., as shown in Equations 1 and 2) state variables $a_0$ to $a_n$, such as shown by $$\begin{bmatrix} x \\ y \\ vx \\ vy \\ lx \\ ly \\ vlx \\ vly \\ a_1 \\ a_2 \\ \ldots \\ a_n \end{bmatrix} \quad (7)$$

where $a_1$ corresponds to a first human activity, $a_2$ corresponds to a second human activity, and $a_n$ corresponds to an nth human activity, where n is an integer number higher than 1.

In some embodiments, the tracker performs, for state variables $a_0$ to $a_n$, a human activity prediction step given by $$\begin{bmatrix} a_1(k+1) \\ a_2(k+1) \\ \ldots \\ a_n(k+1) \end{bmatrix} = f\left(\begin{bmatrix} a_1(k) \\ a_2(k) \\ \ldots \\ a_n(k) \end{bmatrix}\right) \quad (8)$$

where k represents a discrete time step, and f is a transition matrix based on transition probabilities between human activities. In some embodiments, the transition probabilities are not linear. In some embodiments, the prediction step is performed every N frames, where N may be, e.g., 8.

Figure 7:
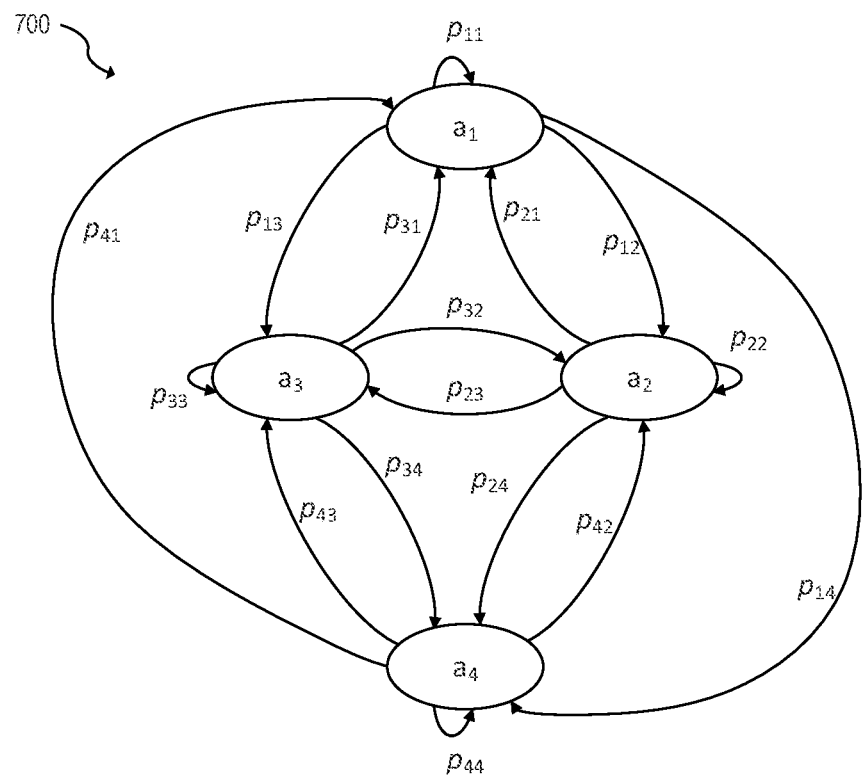
FIG. 7 shows a human activity state transition diagram, according to an embodiment of the present invention.

FIG. 7 shows human activity state transition diagram 700, according to an embodiment of the present invention. As shown in FIG. 7, only four activities are used in this embodiment. It is understood that fewer than four activities, such as, e.g., three or two, or more than four activities, such as five, eight, ten, or more, may also be used.

As a non-limiting example, in an embodiment, state $a_1$ corresponds to waiving, state $a_2$ corresponds to walking, state $a_3$ corresponds to standing, and state $a_4$ corresponds to sitting. The probabilities for each state may or may not be the same. For example, in an embodiment, probability $p_{44}$ (e.g., for remaining sitting once the human target is already sitting) may be, e.g., 0.95, probability $p_{22}$ (e.g., for remaining walking once the human target is already walking) may be, e.g., 0.6, and probability $p_{33}$ (e.g., for remaining standing once the human target is already standing) may be, e.g., 0.6.

The probabilities for transitioning between states may or may not be reciprocal. For example, probability $p_{31}$ (e.g., for transitioning from standing to walking) may be, e.g., 0.1 while probability $p_{13}$ (e.g., for transitioning from walking to standing) may be, e.g., 0.3. And the probability $p_{23}$ (e.g., for transitioning from walking to sitting) may be, e.g., 0.05 while probability $p_{32}$ (e.g., for transitioning from sitting to walking) may be, e.g., 0.05.

In some embodiments, the probability $p_i$ for the associated activity $a_i$ may be calculated by $$p_i = \frac{e^{A_i}}{\sum_{i=1}^{Q} e^{A_i}} \quad (9)$$

where Q is the number of states, and $A_i$ may be given by $$A_i = \sum_{j=1}^{Q} W_{ij} \cdot a_i \quad (10)$$

where $W_{ij}$ is the transition weight for transitioning from activity i to activity j. In other words, Equation 9 may be understood as a softmax operation that normalizes the values of $A_i$ to obtain a probability value $p_i$ for the activity $a_i$.

Figure 8A:
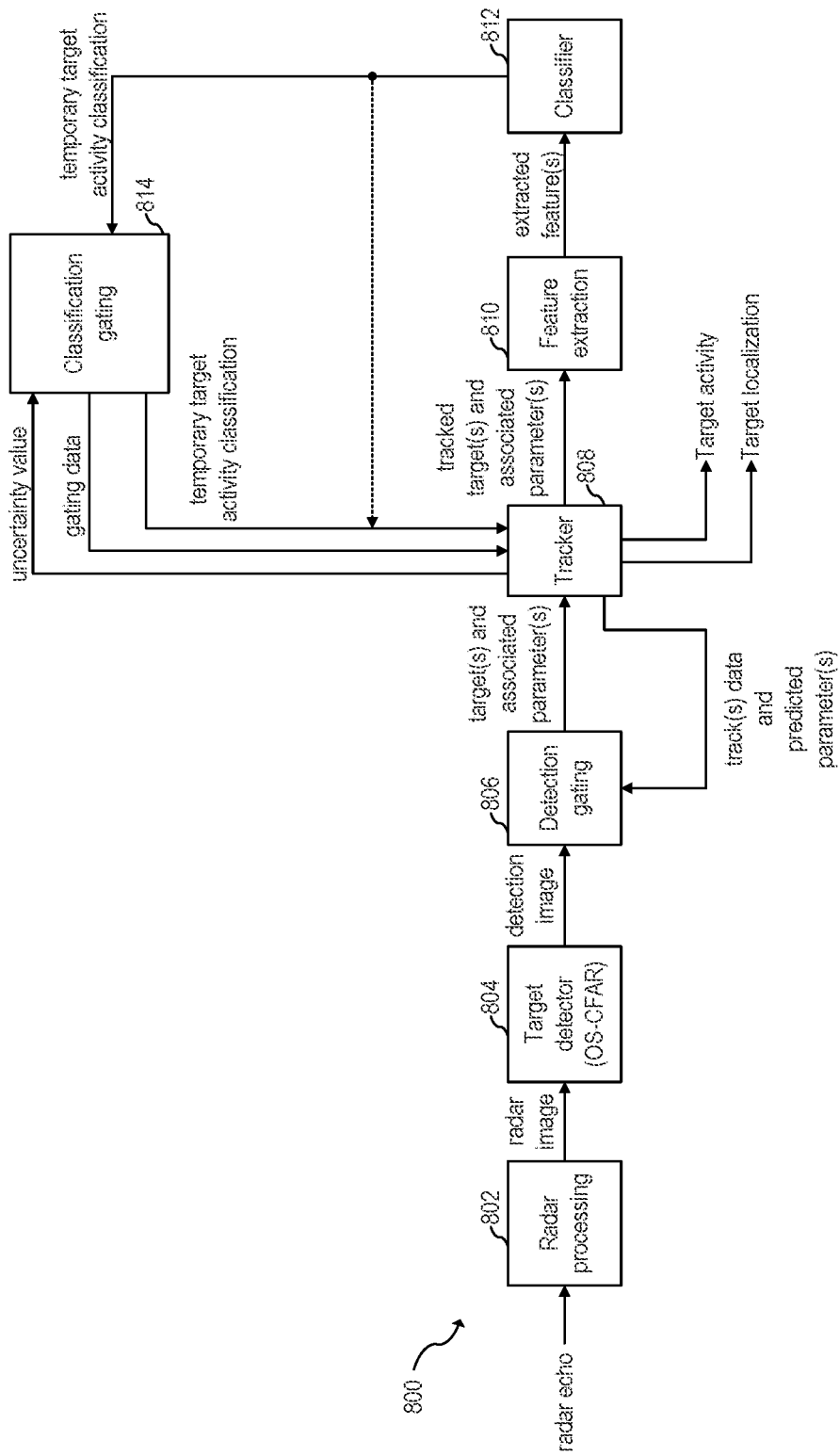
FIG. 8A shows a block diagram for detecting, tracking, and classifying activities of human targets, according to an embodiment of the present invention.

FIG. 8A shows block diagram 800 for detecting, tracking, and classifying activities of human targets, according to an embodiment of the present invention. Blocks 802, 804, 806, 808, 810, 812, and 814 may be implemented, e.g., by processor 104.

Radar processing block 802 generates a radar image based on radar signals received by millimeter-wave radar 102. In some embodiments the radar image is a range-Doppler image. In other embodiments, the radar image is a range cross-range image. For example, in some embodiments, a millimeter-wave radar having two receiving antennas receive radar signals from the field of view (e.g., from reflections from human targets) and generate respective range-Doppler maps. Two dimensional (2D) MTI filters are applied to the respective range-Doppler maps, which results are coherently integrated. After coherent integration, a range-Doppler image is generated.

Target detector block 804 detects potential targets based on the received radar image. For example, in some embodiments, an order statistics (OS) constant false alarm rate (CFAR) (OS-CFAR) detection is performed by target detector 804. Such CFAR detector generates a detection image in which, e.g., "ones" represent targets and "zeros" represent non-targets based, e.g., on the power levels of the range-Doppler image. For example, in some embodiments, the CFAR detector compares the power levels of the range-Doppler image with a threshold, and points above the threshold are labeled as targets while points below the threshold are labeled as non-targets. Although targets may be indicated by ones and non-targets may be indicated by zeros, it is understood that other values may be used to indicate targets and non-targets.

In an embodiment, the OS-CFAR detector uses k-th quartile/median instead of mean CA-CFAR (cell average). Using the k-th quartile/median may advantageously be more robust to outliers.

Detection gating block 806 generates a list of targets and associated parameters based on the detection image, data from tracker 808, and, e.g., Equations 1-6. For example, in some embodiments, targets present in the detection image are clustered using, e.g., a density-based spatial clustering of applications with noise (DBSCAN) algorithm. Parameter estimations are then performed for each clustered target, e.g., using one or more of Equations 1-4. Detection gating block 806 then uses the estimated parameters, predicted parameters received from tracker 808, and, e.g., Equations 6, to screen for useful data, e.g., using ellipsoidal gating. Detection gating block 806 then generates the list of targets and associated estimated screened parameters. The parameters estimated and screened by detection gating block 806 include, for example, angle of arrival (AoA), bounding box dimensions (e.g., lx and ly), rate of change in bounding box dimensions (e.g., vlx and vly), etc., for the respective targets.

Tracker block 808 tracks each target using a respective track by performing a prediction step and an update step for each track. For example, during the prediction step, tracker 808 generates a prediction of the state variables of the tracker (for parameters associated with each track) based on the respective history of each respective track (e.g., using one or more of Equations 1-5, and 7-8). During the update step, tracker 808 associates detected targets with respective tracks based on the output of detection gating block 806.

Tracker block 808 may also generate and kill targets based on the history of the track and based on the new received measurements (e.g., the detected target and associated parameters). Tracker block 808 may also perform track filtering. For example, in some embodiments, tracker block 808 is implemented using an unscented Kalman filter or particle filter to predict one or more parameters associated with each target, such as the range, angle, bounding box dimensions, based on the history of the track and based on new measurements received.

Featured extraction block 810 extract features for each target from an output of tracker block 808. For example, in some embodiments, a Doppler spectrogram is extracted from the history of the corresponding track tracked by tracker block 808. The Doppler spectrogram is used by a classifier block 812, such as a long short-term memory (LSTM) classifier, to generate a temporary target activity classification.

Classification gating block 814 receives the temporary target activity classification from classifier 812, receives from tracker 808 an uncertainty value associated with such temporary target activity classification, and generates a gating data output to indicate whether to use or not to use the temporary target classification based on the uncertainty associated with the temporary target activity classification. For example, in some embodiments, an ellipsoidal gating is used to determine whether a particular temporary target classification should be used (e.g., whether an uncertainty value associated with the temporary target classification is above or below a predetermined threshold). For example, in some embodiments, classification gating block 814 determines a first (Mahalanobis) distance between the temporary target activity classification and the predicted activity classification (generated by tracker 808). For example, in some embodiments, the Mahalanobis distance Md_act may be computed between the predicted measurements Zpred and a new set of measurements Zmeas by $$Md\_act = (Zmeas\_act - Zpred\_act)^T S_{act}^{-1} (Zmeas\_act - Zpred\_act) \quad (11)$$

where $S_{act}^{-1}$ is the covariance matrix between the activity predicted by the tracker Zpred_act and the activity measured by the classifier Zmeas_act.

The determination of the classification distance is also based on the uncertainty value associated with the temporary target activity classification. When the classification distance is lower than a threshold, classification gating block 814 generates a gating data output to signal tracker 808 to use the temporary target activity classification. When the classification distance is higher than the threshold, classification gating block 814 generates a gating data output to signal tracker 808 to use the predicted activity classification.

As shown in FIG. 8A, tracker 808 receives the temporary target activity classification (e.g., from classifier 812 or classification gating block 812) and generates the uncertainty value associated with the temporary target activity classification (e.g., during the prediction step). For example, the tracker uses the classification probabilities from previous time steps to generate an uncertainty value associated with the temporary target activity classification.

Tracker block 808 also receives the gating data from classification gating block 814 and updates the state variables associated with human activities based on such gating data. For example, in some embodiments, tracker block 808 updates the human activity state variables with the value predicted by tracker block 808 when the gating data output indicates that the classification distance is higher than a threshold, and with the temporary target activity classification value when the classification distance is lower than the threshold. Other state variables may also be updated based on the updated human activity state variables. Then tracker block 808 generates a target activity classification and target localization based on the updated state variables. In some embodiments, the target activity classification generated by tracker block 808 is generated using an arg max function. For example, the human activity having the maximum probability weight is the activity selected as the target activity by tracker 808.

As shown in FIG. 8A, tracker block 808 and classifier block 812 operate in a closed-loop manner. In some embodiments, classifier block 812 benefits from tracker block 808 because the tracker block 808 uses the assumption of Gaussian states and the uncertainty associated with it. Therefore, using tracker block 808 allows classifier block 812 to provide, with respect to a target classification, an associated probability and an associated uncertainty (since, in some embodiments, the Bayesian approach of tracker 808 adds an uncertainty measure to the output of classifier 812 that aids in the selection of the next human activity).

In some embodiments, tracker block 808 benefits from classifier block 812 because the state variables track the associated activities of the target, thereby enhancing the prediction step of the tracker (e.g., since more information may be used for the prediction). For example, when two targets cross, the activities associated with each target can help tracker block 808 to associate the right detections to the right tracks. In other words, in some embodiments, tracking human activity states with tracker block 808 improves the probability of correct assignment of the detected targets with respective tracks.

Advantages of some embodiments include an improved response to target misclassifications by using a target classification predicted by the tracker instead of a target classification determined by a classifier and having high uncertainty. In some embodiments, the tracker advantageously achieves a result similar to Bayesian deep learning without implementing the complex neural networks that are conventionally associated with Bayesian deep learning.

Figure 8B:
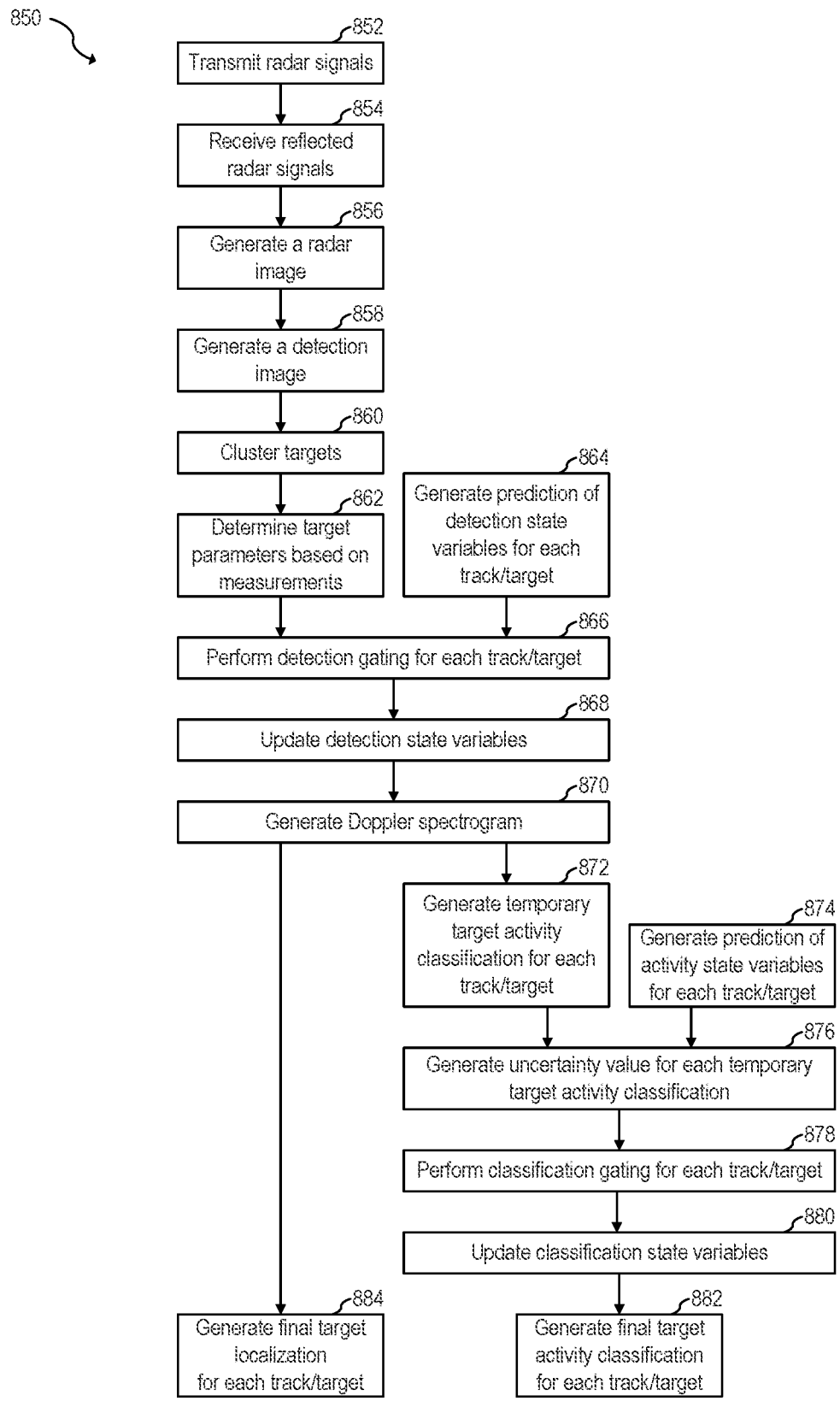
FIG. 8B shows a flow chart of an embodiment method for tracking human targets and corresponding activities, according to an embodiment of the present invention.

FIG. 8B shows a flow chart of embodiment method 850 for tracking human targets and corresponding activities, according to an embodiment of the present invention. Method 850 may be implemented by millimeter-wave radar 102 and processor 104.

During step 852, millimeter-wave radar 102 transmits radar signals (e.g., 106) towards a scene (e.g., 108). For example, millimeter-wave radar 102 may transmit radar chirps organized in frames. During step 854, millimeter-wave radar 102 receives the reflected radar signals.

During step 856, a radar image is generated, e.g., by radar processing block 802, based on the received reflected radar signals. During step 858, a detection image (e.g., a matrix including "1" for detected targets and "0" otherwise) is generated, e.g., by target detector block 704.

During step 860, the detected targets of the detection image are clustered, e.g., by detection gating block 806. For example, since a target human may exhibit a double spread across range and Doppler bins, it is possible that multiple detected targets in the detection image belong to a single human target. During step 860, targets with high probability of belonging to a single human target are clustered together.

During step 862, parameters of each clustered target are determined based on the radar measurements (e.g., based on the received reflected radar signals and subsequent processing). During step 862, parameters such as r (range of the target from the millimeter-wave radar sensor), θ (angle of arrival–angle of the target), $v_c$ (radial velocity of the target), $L_r$ (bounding box dimension across range), and $L_d$ (bounding box dimension across Doppler) are determined for each clustered target.

During step 864, a tracker tracking human targets, such as tracker 808, generates a prediction for detection state variables for each human target being tracked based on the history of the corresponding track. Detection state variables may include one or more of the variables of Equations 1 and 2, for example.

During step 866, detection gating is performed, e.g., by detection gating block 806. For example, for each tracked target, a detection distance may be determined between the measured parameters and the predicted parameters, e.g., using Equation 5. When the measurement of a target is inside the gating region (i.e., the detection distance is below a predetermined threshold), the tracker updates the detection state variables of such target with the measured values during step 868. When the measurement of the target is outside the gating region (i.e., the detection distance is above the predetermined threshold), the tracker updates the detection state variables of such target with the predicted values during step 868.

During step 870, a Doppler spectrogram is generated based on the updated detection state variables and on the radar image, e.g., by feature extraction block 810. During step 872, a temporary target activity classification is generated for each tracked human target, e.g., by classifier 812. For example, classifier 812 may generate, for each tracked human target, a vector including probabilities for each possible activity. The temporary target activity classification (the activity label) of each tracked target is the activity having the highest probability of the corresponding vector.

During step 874, predicted values for activity state variables are generated (e.g., by tracker 808) for each track, e.g., using Equation 8. During step 876, an uncertainty value is associated with each temporary target activity classification based on the predicted value of the corresponding activity state variable of the corresponding target e.g., using Bayes recursion.

During step 878, classification gating is performed, e.g., by classification gating block 814. For example, in some embodiments, for each tracked target, a classification distance may be determined by computing a Mahalanobis distance between the temporary target activity classification and the predicted activity classification. When the temporary target activity classification of a target is inside the gating region (i.e., the classification distance is below a predetermined threshold), the tracker updates the classification state variables of such target with the temporary target activity classification during step 880. When the temporary target activity classification of the target is outside the gating region (i.e., the classification distance is above the predetermined threshold), the tracker updates the classification state variables of such target with the predicted values during step 880.

During step 882, the final target classification is generated for each target based on the updated classification state variables of the tracker. During step 884, the localization of the target is generates for each target based on the updated detection state variables of the tracker.

In an embodiment, a classifier uses data associated with human activity state transitions to improve human target activity classification. A first stage of the classifier is trained with human activity snippets. A second stage of the classifier is trained with human activity transition snippets.

Figure 9:
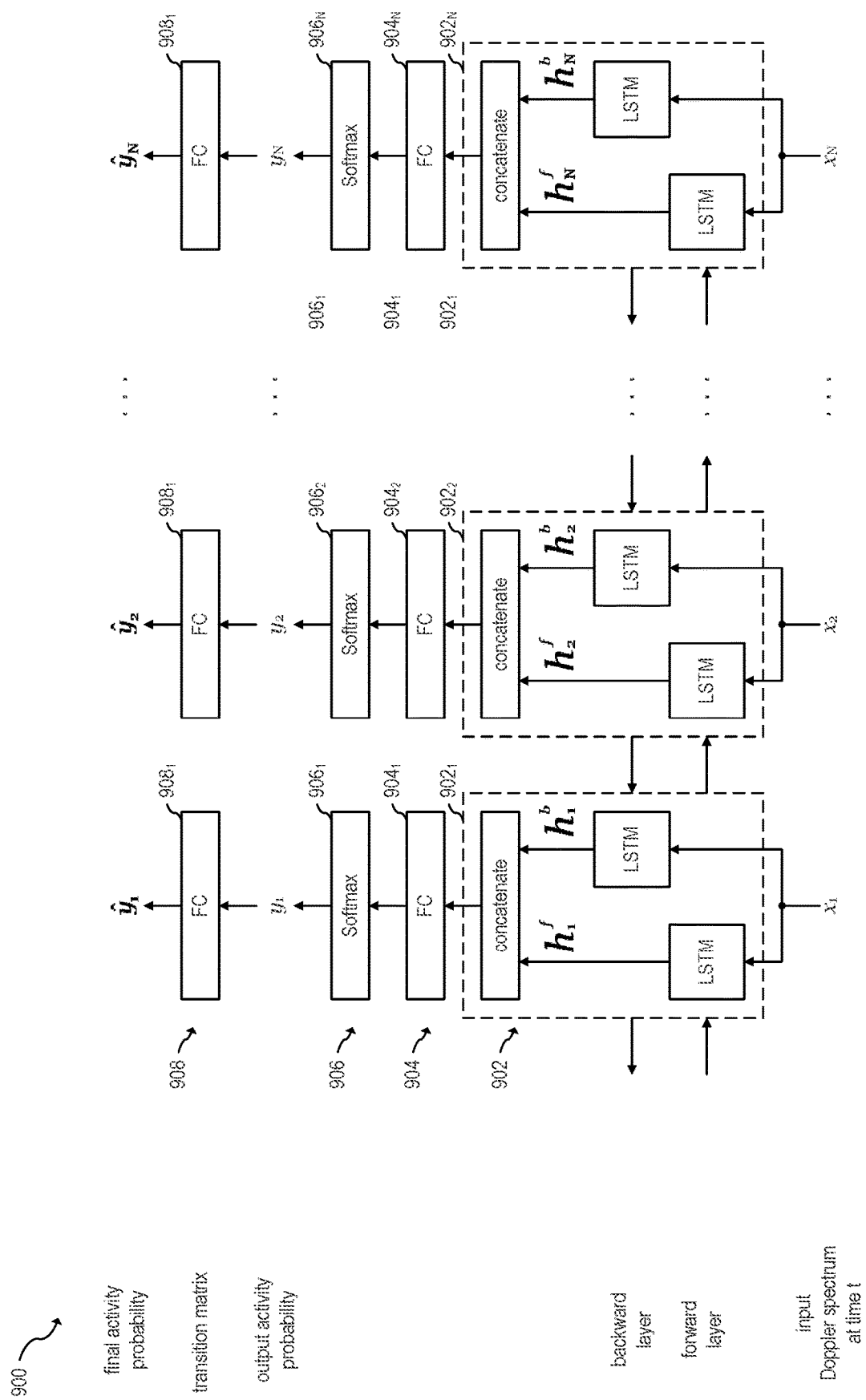
FIG. 9 shows a classifier for classifying human activities, according to an embodiment of the present invention.

FIG. 9 shows classifier 900 for classifying human activities, according to an embodiment of the present invention. Classifier 308 and 812 may be implemented as classifier 900. Classifier 900 is implemented with an activity model that includes a first stage including bidirectional LSTM network 902, fully connected (FC) layers 904, and softmax layer 906, and a second stage including FC layer 908.

During normal operation, classifier 900 receives as input N spectrograms $x_1$ to $x_N$, corresponding to N (consecutive) frames (e.g., from features extracted from tracker 304 or 808). In some embodiments, N is an integer number higher than 1, such as 4, 8, 32 or higher.

Bidirectional LSTM network 902 generates human target activity vectors based on respective input spectrograms $x_1$ to $x_N$, which, after being processed by fully connected layer 904 and softmax layer 906, result in output activity probabilities $y_1$ to $y_N$. Fully connected layer 908, which implements the transition matrix f from Equation 8, receives the output activity probabilities $y_1$ to $y_N$ and generates corresponding final activity probabilities $\hat{y}_1$ to $\hat{y}_N$. Vector $\hat{y}_N$, which in some embodiments is produced every N frames, is a vector that includes the probabilities of each of the human activities considered. The human activity of vector $\hat{y}_N$ having the higher probability corresponds to the "target classification" of FIG. 3, and to the "temporary target activity classification" of FIG. 8A.

Bidirectional LSTM network 902, fully connected layers 904 and 908, and softmax layer 906 may be implemented in any way known in the art.

In some embodiments, classifier 900 is trained in two steps. A first step trains the first stage of classifier 900 while a second step trains the second stage of classifier 900.

During the first step of training classifier 900, first spectrogram snippets associated with human activities, where the first spectrogram snippets are truncated Doppler spectrograms that do not include transitions between activities, are supplied as inputs $x_1$ to $x_N$. Bidirectional LSTM network 902 and layers 904 and 906 are trained while monitoring outputs $y_1$ to $y_N$ (e.g., as described with respect to FIG. 10A).

After the first stage of classifier 900 is trained during the first step of training classifier 900, the second stage of classifier 900 is trained. During the second step of training classifier 900, second spectrogram snippets associated with human activity transitions are supplied as inputs $x_1$ to $x_N$. Fully connected layer 908 is trained while monitoring outputs $\hat{y}_1$ to $\hat{y}_N$ (e.g., as described with respect to FIG. 10A). Bidirectional LSTM network 902 and layers 904 and 906 are not modified during the second step of training classifier 900.

Figure 10A:
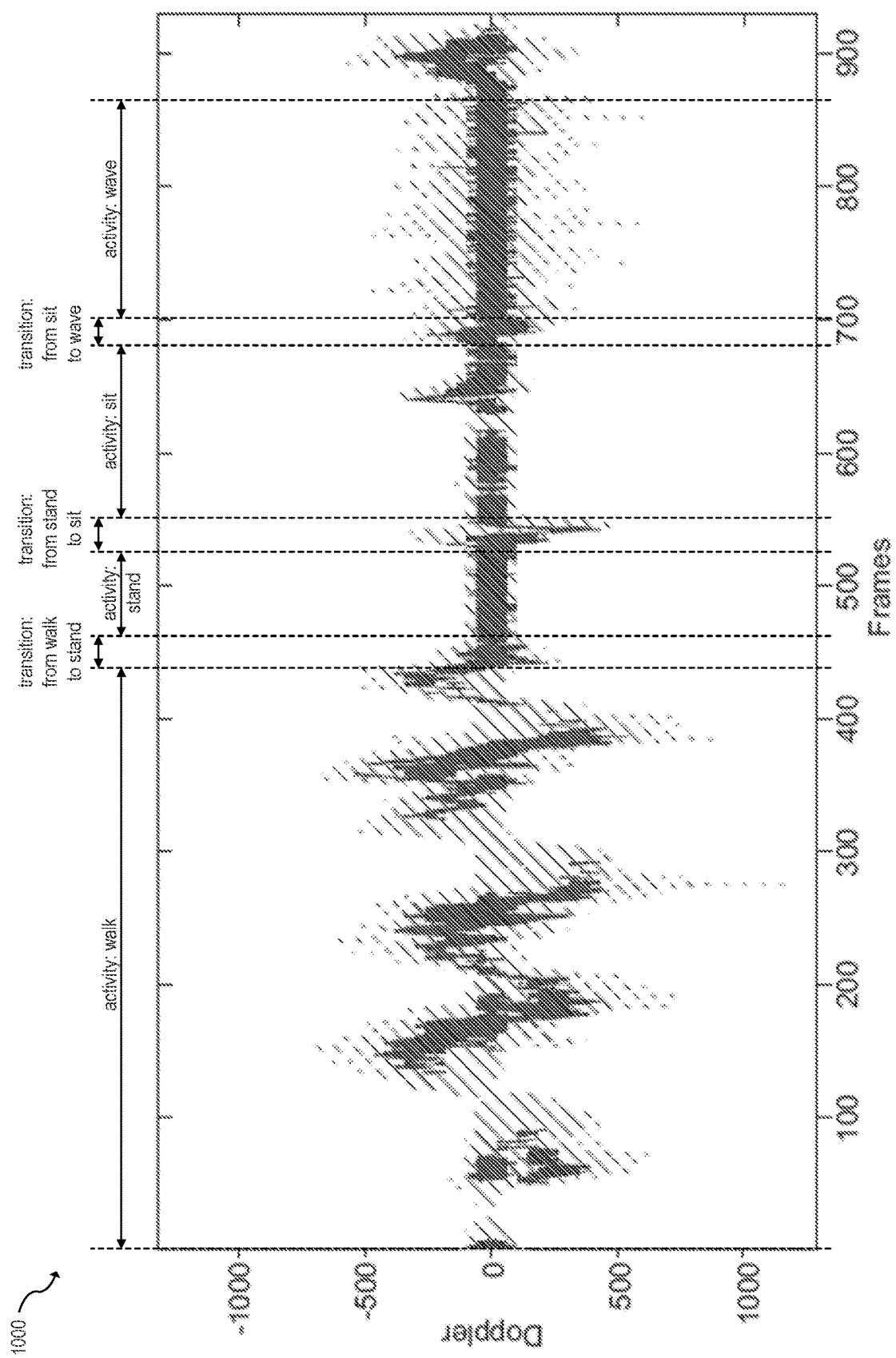
FIG. 10A shows an example of a Doppler spectrogram of human activities and activity transitions of a human target, according to an embodiment of the present invention.

FIG. 10A shows Doppler spectrogram 1000 of human activities and activity transitions of a human target, according to an embodiment of the present invention. As shown in FIG. 10A, a human target may transition between activities during a period of time. During the first step of training classifier 900, the first spectrogram snippets may include snippets similar to activity snippets shown in FIG. 10A (e.g., walk, stand, sit, and wave). During the second step of training classifier 900, the second spectrogram snippets may include snippets similar to transition snippets shown in FIG. 10A (e.g., transition from walk to stand, transition from stand to sit, and transition from sit to wave).

Figure 10B:
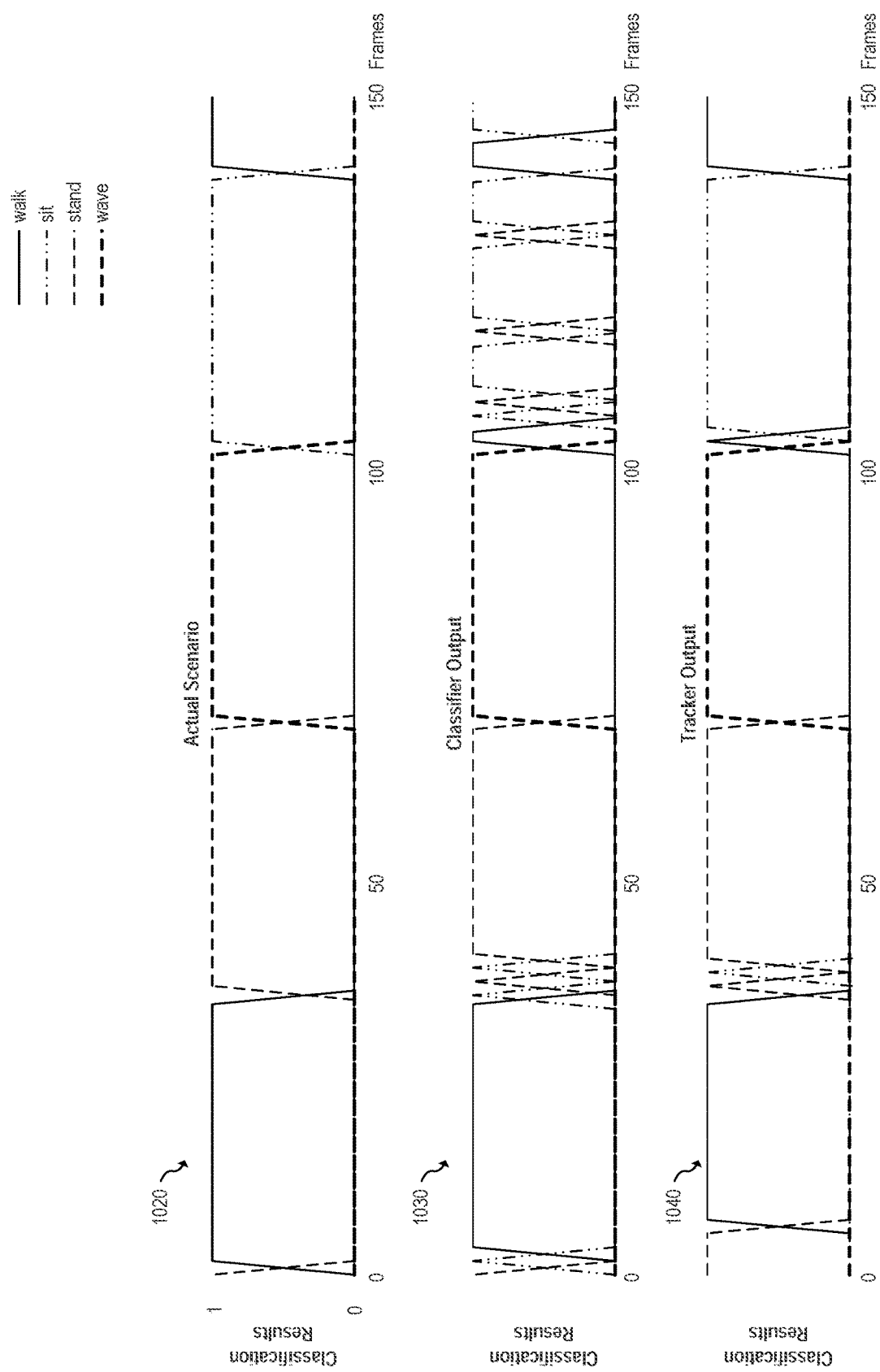
FIG. 10B illustrate plots showing actual activity classification results, the output of a classifier, and the output of a tracker, according to an embodiment of the present invention.

FIG. 10B illustrate plots 1020, 1030, and 1040 showing actual activity classification results, the output of classifier 812 (e.g., 900), and the output of tracker 808, respectively, according to an embodiment of the present invention. Plots 1020, 1030, and 1040 of FIG. 10B corresponds to Doppler spectrogram 1000 of FIG. 10A. As shown by FIG. 10B, the output of tracker 808 (curve 1040) is closer to the actual activity classification result (curve 1020) than the output of classifier 812 (curve 1030). In other words, FIG. 10B shows an improved performance when using tracker 808 for classification of human activity when compared to using classifier 812 in open loop.

FIGS. 10C and 10D show confusion matrices for classifier 812 and tracker 808, respectively, according to an embodiment of the present invention. The confusion matrices of FIGS. 10C and 10D correspond to plots 1020, 1030, and 1040 of FIG. 10B and to Doppler spectrogram 1000 of FIG. 10A. As illustrated in FIGS. 10C and 10D, in an embodiment, the tracker 808 shows improved accuracy, with 94.1% total actual correct predictions when compared to the classifier 812 accuracy alone, which shows 87.4% total actual correct predictions.

By including activity transitions in the training of the classifier, some embodiments advantageously minimize or eliminate misclassifications arising from transitions between activities.

Figure 11:
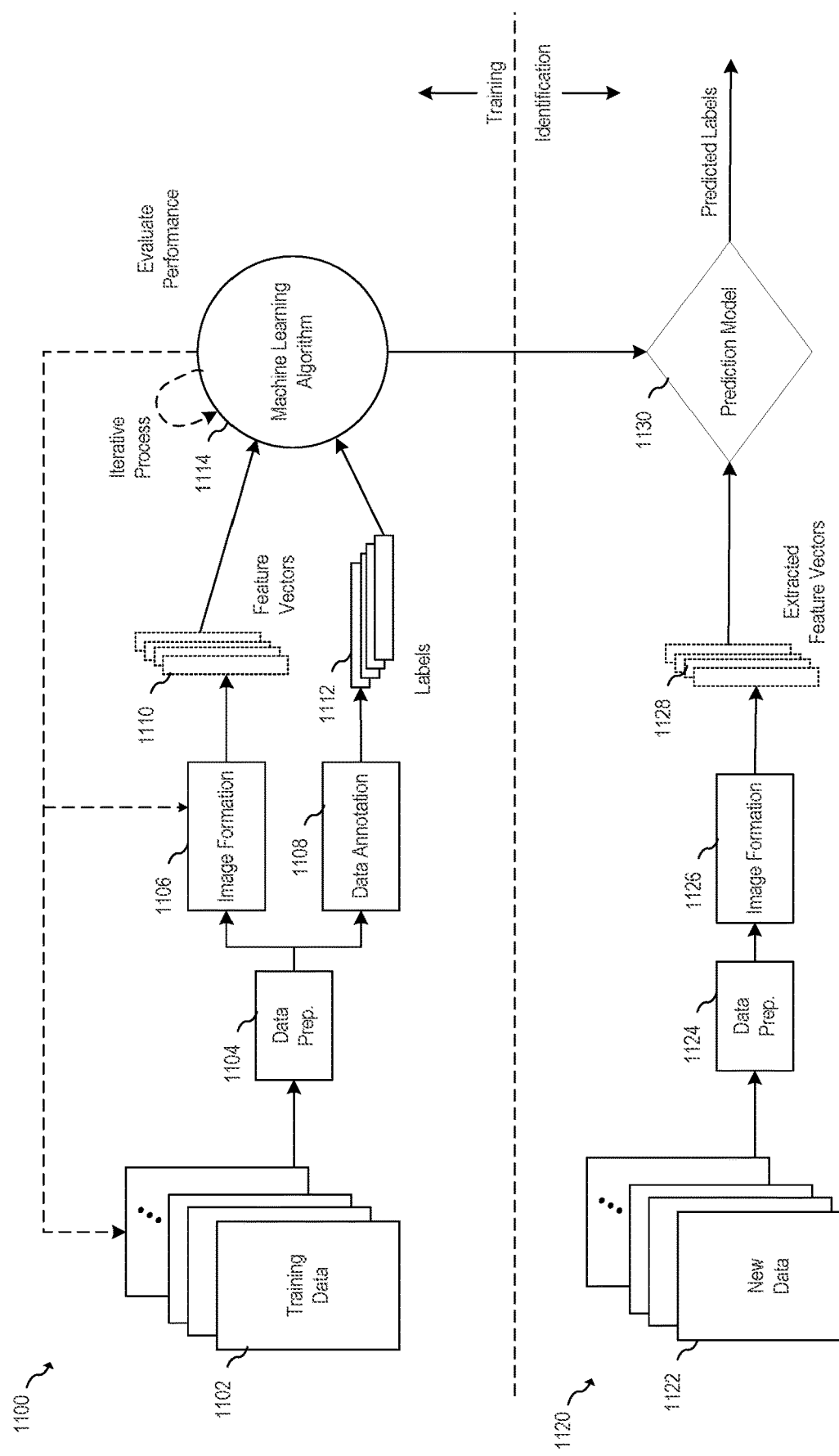
FIG. 11 illustrates a block diagram showing a machine learning pipeline for machine language based feature extraction and identification that can be used to train the classifier of FIG. 9 to classify human targets based on human activities.

FIG. 11 illustrates block diagram 1100 showing a machine learning pipeline for machine language based feature extraction and identification that can be used to train classifier 900 to classify human targets based on human activities. The top portion 1100 of FIG. 11 is devoted to the processing of training features (e.g., Doppler spectrograms snippets) for configuring the first and second portions of classifier 900. The bottom portion 1120 is devoted to the processing new measurements using the trained classifier 900 (e.g., trained as shown in top portion 1100).

As shown in the top portion 1100 of FIG. 11, training data 1102 is transformed into feature vectors 1110 and corresponding labels 1112. Training data 1102 represents the raw data (e.g., echo). Feature vectors 1110 represent sets of generated vectors that are representative of the training data 1102. Labels 1112 represent user metadata associated with the corresponding training data 1102 and feature vectors 1110. For example, during the first step of training classifier 900, training data 1102 includes first spectrogram snippets associated with human activities and corresponding labels (e.g., walk, stand, sit, wave, etc.). During the second step of training classifier 900, training data 1102 includes second spectrogram snippets associated with human activity transitions with human activities and corresponding labels (e.g., transition from walk to stand, transition from stand to sit, transition from sit to wave, etc.).

As shown, training data 1102 is transformed into feature vectors 1110 using image formation algorithms. Data preparation block 1104 represents the initial formatting of raw sensor data, and data annotation block 1108 represents the status identification from training data 1102.

During training, one or more radar images are taken of a controlled environment that includes one or more static and moving targets (e.g., humans, moving machinery, furniture, and other moving equipment) using, e.g., a millimeter-wave radar. In some cases, multiple radar images are recorded to increase the accuracy of identification. Machine learning algorithm 1114 evaluates the ability of a prediction model 1130 to identify feature vectors and iteratively updates training data 1102 to increase the classification accuracy of the algorithm. The training performance of the machine learning algorithm may be determined by calculating the cross-entropy performance. In some embodiments, the machine learning algorithm 1114 iteratively adjusts image formation parameters for a classification accuracy of at least 90%. 1 Alternatively, other classification accuracies could be used.

Machine learning algorithm 1114 may be implemented using a variety of machine learning algorithms known in the art. For example, a random forest algorithm or neural network algorithm, such as a ResNet-18 or other neural network algorithm known in the art, may be used for classification and analysis of feature vectors 1110. During the iterative optimization of feature vectors 1110, a number of parameters of image formation 1106 may be updated.

Once the classifier has been trained using reference training data 1102, the reference signatures may be used for classification during normal operation. The trained classifier 900 is represented in bottom portion 1120 as the prediction model 1130. During normal operation, new target data 1122 is received. Data preparation block 1124 (which, e.g., corresponds to blocks 802, 804, 806, and 808) prepares the new target data 1122 for image formation, and image formation block 1126 (which, e.g., corresponds to block 810) forms new extracted feature vectors 1128. Prediction model 1130 (e.g., classifier 900) generates a predicted label (e.g., an activity classification) based on extracted feature vectors 1128.

Example embodiments of the present invention are summarized here. Other embodiments can also be understood from the entirety of the specification and the claims filed herein.

Example 1

A method for tracking a target using a millimeter-wave radar, the method including: receiving radar signals using the millimeter-wave radar; generating a range-Doppler map based on the received radar signals; detecting a target based on the range-Doppler map; tracking the target using a track; generating a predicted activity label based on the track, where the predicted activity label is indicative of an actual activity of the target; generating a Doppler spectrogram based on the track; generating a temporary activity label based on the Doppler spectrogram; assigning an uncertainty value to the temporary activity label, where the uncertainty value is indicative of a confidence level that the temporary activity label is an actual activity of the target; and generating a final activity label based on the uncertainty value.

Example 2

The method of example 1, where generating the final activity label includes, when the uncertainty value is above a predetermined threshold, using the predicted activity label as the final activity label, and when the uncertainty value is below the predetermined threshold, using the temporary activity label as the final activity label.

Example 3

The method of one of examples 1 or 2, where generating the final activity label includes using elliptical gating to determine whether the uncertainty value is above or below the predetermined threshold.

Example 4

The method of one of examples 1 to 3, further including using an activity model to generate the temporary activity label, where the activity model includes a first stage and a second stage, the first stage including a long short-term memory (LSTM) network and the second stage including a fully connected layer, where the second stage has an input coupled to an output of the first stage.

Example 5

The method of one of examples 1 to 4, further including training the first stage with Doppler spectrograms snippets of truncated target activities.

Example 6

The method of one of examples 1 to 5, further including training the second stage with Doppler spectrograms snippets of transitions between target activities.

Example 7

The method of one of examples 1 to 6, further including: training the first stage with Doppler spectrograms snippets of truncated target activities; and after training the first stage, training the second stage with Doppler spectrograms snippets of transitions between target activities.

Example 8

The method of one of examples 1 to 7, where tracking the target includes tracking the target using an unscented Kalman filter.

Example 9

The method of one of examples 1 to 8, where the target is a human target.

Example 10

The method of one of examples 1 to 9, where generating the temporary activity label includes using a long short-term memory (LSTM) classifier.

Example 11

The method of one of examples 1 to 10, where generating the predicted activity label based on the track includes generating the predicted activity label based on state variables associated with corresponding activities.

Example 12

The method of one of examples 1 to 11, further including determining a location of the target based on the state variables associated with corresponding activities.

Example 13

A millimeter-wave radar system including: a millimeter-wave radar configured to transmit and receive radar signals; and a processor including: a radar processing block configured to generate a range-Doppler map based on the radar signals received by the millimeter-wave radar; a target detector block configured to detect a target based on the range-Doppler map; a tracker configured to: track the target using a track, and generate a predicted activity label based on the track, where the predicted activity label is indicative of an actual activity of the target; a feature extraction block configured to generate a Doppler spectrogram based on the track; a classifier configured to generate a temporary activity label based on the Doppler spectrogram; and a classification gating block configured to receive an uncertainty value associated to the temporary activity label and produce gating data based on the uncertainty value, the predicted activity label, and the temporary activity classification, where the uncertainty value is indicative of a confidence level that the temporary activity label is an actual activity of the target, and where the tracker is configured to generate a final activity label based on the gating data.

Example 14

The system of example 13, where the tracker is configured to use the predicted activity label as the final activity label when the uncertainty value is above a predetermined threshold, and to use the temporary activity label as the final activity label when the uncertainty value is below the predetermined threshold.

Example 15

The system of one of examples 13 or 14, where the classifier includes a first stage and a second stage, the first stage including a long short-term memory (LSTM) network and the second stage including a fully connected layer, where the second stage has an input coupled to an output of the first stage.

Example 16

The system of one of examples 13 to 15, where the first stage further includes: a second fully connected layer having an input coupled to the LSTM network; and a softmax layer having an input coupled to an output of the second fully connected layer and an output coupled to the output of the first stage.

Example 17

The system of one of examples 13 to 16, where the radar signals include linear chirps.

Example 18

A method for tracking a target using a millimeter-wave radar, the method including: receiving radar signals using the millimeter-wave radar; generating a range-Doppler map based on the received radar signals; detecting a target based on the range-Doppler map; using a tracker to track the target using a track; using a classifier to generate a temporary activity label based on an output of the tracker; and using the tracker to generate a final activity label based on an output of the classifier, where the tracker tracks activity labels of the target using state variables.

Example 19

The method of example 18, where the tracker uses a predicted activity label as the final activity label when an uncertainty value associated with the temporary activity label is above a predetermined threshold, and uses the temporary activity label as the final activity label when the uncertainty value is below the predetermined threshold, where the tracker generates the predicted activity label based on the state variables.

Example 20

The method of one of examples 18 or 19, where the tracker includes an unscented Kalman filter.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for tracking a target using a millimeter-wave radar, the method comprising:
    receiving radar signals using the millimeter-wave radar;
    generating a range-Doppler map based on the received radar signals;
    detecting a target based on the range-Doppler map;
    tracking the target using a track;
    generating a predicted activity label based on the track, wherein the predicted activity label is indicative of an actual activity of the target;
    generating a Doppler spectrogram based on the track;
    generating a temporary activity label based on the Doppler spectrogram;
    assigning an uncertainty value to the temporary activity label, wherein the uncertainty value is indicative of a confidence level that the temporary activity label is an actual activity of the target; and
    generating a final activity label based on the uncertainty value.

2. The method of claim 1, wherein generating the final activity label comprises, when the uncertainty value is above a predetermined threshold, using the predicted activity label as the final activity label, and when the uncertainty value is below the predetermined threshold, using the temporary activity label as the final activity label.

3. The method of claim 2, wherein generating the final activity label comprises using elliptical gating to determine whether the uncertainty value is above or below the predetermined threshold.

4. The method of claim 1, further comprising using an activity model to generate the temporary activity label, wherein the activity model comprises a first stage and a second stage, the first stage comprising a long short-term memory (LSTM) network and the second stage comprising a fully connected layer, wherein the second stage has an input coupled to an output of the first stage.

5. The method of claim 4, further comprising training the first stage with Doppler spectrograms snippets of truncated target activities.

6. The method of claim 4, further comprising training the second stage with Doppler spectrograms snippets of transitions between target activities.

7. The method of claim 4, further comprising:
    training the first stage with Doppler spectrograms snippets of truncated target activities; and
    after training the first stage, training the second stage with Doppler spectrograms snippets of transitions between target activities.

8. The method of claim 1, wherein tracking the target comprises tracking the target using an unscented Kalman filter.

9. The method of claim 1, wherein the target is a human target.

10. The method of claim 1, wherein generating the temporary activity label comprises using a long short-term memory (LSTM) classifier.

11. The method of claim 1, wherein generating the predicted activity label based on the track comprises generating the predicted activity label based on state variables associated with corresponding activities.

12. The method of claim 11, further comprising determining a location of the target based on the state variables associated with corresponding activities.

13. A millimeter-wave radar system comprising:
    a millimeter-wave radar configured to transmit and receive radar signals; and
    a processor comprising:
        a radar processing block configured to generate a range-Doppler map based on the radar signals received by the millimeter-wave radar;
        a target detector block configured to detect a target based on the range-Doppler map;
        a tracker configured to:
            track the target using a track, and
            generate a predicted activity label based on the track, wherein the predicted activity label is indicative of an actual activity of the target;
        a feature extraction block configured to generate a Doppler spectrogram based on the track;
        a classifier configured to generate a temporary activity label based on the Doppler spectrogram; and
        a classification gating block configured to receive an uncertainty value associated to the temporary activity label and produce gating data based on the uncertainty value, the predicted activity label, and the temporary activity label, wherein the uncertainty value is indicative of a confidence level that the temporary activity label is an actual activity of the target, and wherein the tracker is configured to generate a final activity label based on the gating data.

14. The system of claim 13, wherein the tracker is configured to use the predicted activity label as the final activity label when the uncertainty value is above a predetermined threshold, and to use the temporary activity label as the final activity label when the uncertainty value is below the predetermined threshold.

15. The system of claim 13, wherein the classifier comprises a first stage and a second stage, the first stage comprising a long short-term memory (LSTM) network and the second stage comprising a fully connected layer, wherein the second stage has an input coupled to an output of the first stage.

16. The system of claim 15, wherein the first stage further comprises:
    a second fully connected layer having an input coupled to the LSTM network; and
    a softmax layer having an input coupled to an output of the second fully connected layer and an output coupled to the output of the first stage.

17. The system of claim 13, wherein the radar signals comprise linear chirps.

18. A method for tracking a target using a millimeter-wave radar, the method comprising:
    receiving radar signals using the millimeter-wave radar;
    generating a range-Doppler map based on the received radar signals;
    detecting a target based on the range-Doppler map;
    using a tracker to track the target using a track;
    using a classifier to generate a temporary activity label based on an output of the tracker; and
    using the tracker to generate a final activity label based on an output of the classifier, wherein the tracker tracks activity labels of the target using state variables.

19. The method of claim 18, wherein the tracker uses a predicted activity label as the final activity label when an uncertainty value associated with the temporary activity label is above a predetermined threshold, and uses the temporary activity label as the final activity label when the uncertainty value is below the predetermined threshold, wherein the tracker generates the predicted activity label based on the state variables.

20. The method of claim 18, wherein the tracker comprises an unscented Kalman filter.

* * * * *